Patented Apr. 4, 1944

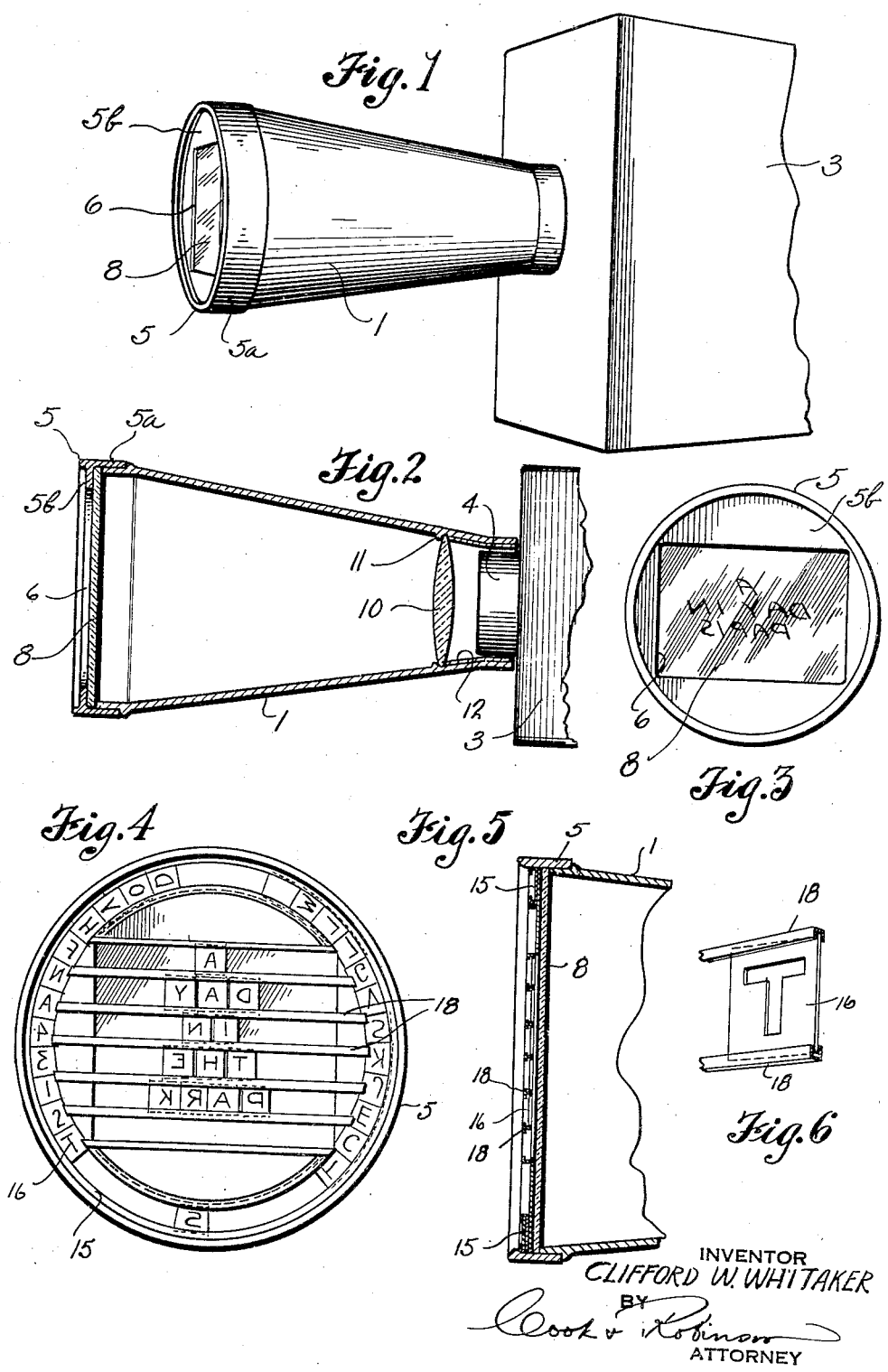

2,346,096

UNITED STATES PATENT OFFICE 2,346,096

FILM TITLER

Clifford W. Whitaker, Fort Lewis, Wash.

Application May 18, 1942, Serial No. 443,373

2 Claims. (Cl. 88—24)

This invention relates to camera accessories, and it has reference more particularly to devices known in that particular art to which they belong as "film titlers" and which are used for the photographing of titles, headings or captions on the picture film strip.

It is the principal object of this invention to provide a novel film titler for the purpose above stated that may be easily and readily applied to and removed from the camera for the direct photographing of a heading or title onto the film strip, which is simple in its construction and mode of use; relatively inexpensive and which provides that the titles, as photographed, will be exceptionally distinct and clear cut.

More specifically stated, the present invention resides in the provision of a film titler of the character above stated which comprises a tubular conically tapered, light-proof housing, adapted to be fitted at its smaller end over the projecting sleeve of the lens housing of the camera, and which, at its larger end, is equipped with a translucent or transparent plate on which the title, heading or caption for the subject to be photographed may be inscribed. Within the conical housing is a condensing lens of proper design whereby the image of the title or heading inscribed on the translucent or transparent plate will be reduced for photographing, through the camera lens, directly on the film strip, either before or after the subject matter has been photographed.

Other objects of this invention reside in the details of construction, and combination of parts embodied in the film titler, as will hereinafter be fully described.

In accomplishing these and other objects of the invention, I have provided the improved details of construction, the preferred forms of which are illustrated in the accompanying drawing, wherein—

Fig. 1 is a perspective view of a film titler embodied by the present invention as applied to a camera.

Fig. 2 is an axial, sectional view of the same.

Fig. 3 is a front end view of the device, showing a title as inscribed on the translucent title plate.

Fig. 4 is an enlarged, front end view of a device of an alternative form using adjustable characters.

Fig. 5 is a cross section of the same.

Fig. 6 is an enlarged view of one of the character plates of the device of Fig. 4, and a part of a guideway.

Referring more in detail to the drawing—

The present device, primarily, is intended for use with motion picture cameras of the smaller types, for example those types of cameras used extensively by amateurs, and which use eight millimeter or sixteen millimeter film. However, it is not my intention that the device shall be limited in its use to any particular kind, or size of camera so long as it can be applied thereto in accordance with the objects of this invention.

The present device is an accessory, or attachment, and is designed for ready application to the sleeve or extended lens housing of the camera, and it is formed with an open end that may fit snugly thereover. In some instances, a special mounting may be required to adapt the titler to the camera and it is anticipated that the device be made in various sizes to accommodate cameras having lens housings of different size, and also that adapters for the various cameras be provided so that the titler might be made in one or more standardized sizes.

In its present preferred form of construction, the film titler comprises a conically tapered, tubular housing 1 of light-proof material, either metal, plastic or fibre, and preferably having its inside surface coated with dull black paint. The smaller end of the conically tapered housing is open and is of such diameter and shape as to snugly fit over the extension cuff of the lens housing of the camera or onto the lens case, thus to mount the device properly for use.

In Fig. 2, a camera has been designated by reference numeral 3 and the lens housing is designated by numeral 4, and the film titler is here shown as functionally applied thereto.

At its outer or larger end, the housing 1 has a cap 5 fitted thereto. This cap comprises an annular cylindrical flange 5a that fits about the larger end portion of the housing 1 and an end closure wall 5b that is formed with a rectangular opening 6. The cap also is of a light-proof material such as metal, plastic or fibre. Fitted within the cap, and against the inside of the end wall 5b, is a transparent or translucent panel 8 of glass, or other suitable material, on which a title might be inscribed with ink, pencil or other marking means. When the cap 5 is applied to the housing 1, the glass panel 8 is held between the wall 5b and the larger end of the housing.

Fitted in the housing, adjacent its smaller end and just forwardly of the camera lens housing 4, is a reducing lens 10 held in place by an annular bead 11 and an inserted bushing 12 of felt or other suitable material.

In the use of this device, the title, heading or caption that is to be photographed on the film strip, is written, or marked on the inside surface of the translucent or transparent plate. To accomplish this in the easiest way, the cap should be removed from the housing 1, so that easy access to the plate may be had. Preferably, the glass would be frosted, or otherwise formed with a surface that may be easily written on by pencil or ink and from which the marks can be removed. After the inscription has been placed on the glass, the cap is replaced on the housing 1 and the device applied to the camera as shown in Fig. 2. The camera lens is then adjusted for opening and distance, the camera pointed skyward or toward a light background, and the camera lens is opened, allowing an exposure of about ten seconds, or longer if desired.

In Figs. 4 and 5, I have illustrated an alternative form of device wherein an annular track 15 is fitted within the periphery of the cap 5 and this track has small metal plates 16 slidable therein, each plate with a letter cut therefrom. Supported from the track, and extending directly across the wall opening are horizontal guideways into which the letter plates 16 may be moved from the trackway 15. These horizontal guideways are formed by spaced, paired rails 18—18 of channel-like form, facing each other and adapted to contain the opposite edges of a metal plate 16 therein, as seen in Fig. 6.

In use of this latter device to make up a title, the proper plates 16 are selected from the annular trackway and moved into the selected horizontal trackway in the order needed to form the words of a title. The use of this device, otherwise, is like that of the device first described.

Film titlers of this kind may be made in various sizes and the proportions or measurements might vary from those shown. At the present time, it has been found practical to make the housing 1 approximately three and seven eighths inches long, one inch in diameter at its smaller end, and two and one-eighth inches in diameter at its larger end. The condensing lens is located five-eighths of an inch from the smaller end of the housing.

With this device, the camera operator can readily apply titles to the film strip prior to or following the photographing of a scene, and in this way the tedious task of film cutting, splicing and inserting titles after a scene has been photographed, is avoided.

Having thus described my invention, what I claim as new therein and desire to secure by Letters Patent is:

1. A film titler of the character described comprising a conically tapered tubular housing of light-proof material, open at its smaller end and cylindrically formed to be fitted at that end, over the extension of the camera lens assembly to support the housing, an annular cap of light-proof material removably fitted about the larger end of the conical housing, having an elongated opening therein alined with the camera lens, and a translucent panel held within the cap over said opening and on which panel film titles may be inscribed for photographing by the camera, and a reducing lens mounted in the conical housing just forwardly of the smaller end.

2. A film titler of the character described comprising a tubular light-proof housing having an open inner end adapted to be fitted to the objective lens of a camera, and having its outer end open and fitted with a translucent panel, an annular guideway with an opaque base member extending between the edges thereof applied within the outer end of the housing, character plates contained in said guideway and movable therein, and open guideways extended across the translucent panel and communicating with said annular guideway into which said character plates may be selectively shifted from said annular guideway for photographing by the camera.

CLIFFORD W. WHITAKER.